UNITED STATES PATENT OFFICE 2,483,749

QUATERNARY AMMONIUM SALTS

Harold Wittcoff, Minneapolis, Minn., assignor to General Mills, Inc., a corporation of Delaware No Drawing. Application February 24, 1948,
Serial No. 10,561

5 Claims. (Cl. 260—279)

The present invention relates to quaternary ammonium salts of polymerized epichlorhydrins. These polymerized quaternary salts have the following unit structure:

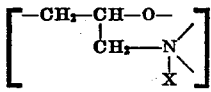

in which X is halogen and the nitrogen atom is contained in a ring system.

Compounds of the present invention provide quaternary salts with a high degree of functionality. Moreover this functionality can be varied by varying the size of the epichlorhydrin polymer and also by varying the extent to which the epichlorhydrin polymer has been converted to a quaternary salt.

It is therefore an object of the present invention to provide quaternary ammonium salts of polymeric epichlorhydrin.

In preparing the quaternary ammonium salts it is possible to start with polymerized epihalohydrin. This compound may be prepared by a variety of procedures. One desirable method involves the treatment of epihalohydrin in a solution, for example in carbon tetrachloride, with a complex of boron trifluoride-ethyl ether. The size of the polymer may be varied depending upon the selection of the solvent, concentration of catalyst, time of reaction, and the temperature, increases in time, temperature and concentration of catalyst tending to increase the size of the polymer. While very large polymers may be obtained, it has been found that those which are most desirable are those in which the polymer is built up from 2 to 50 epihalohydrin units, and of these, the ones in which the number of units is from 6-12 are preferred. Numerous other methods of polymerizing epihalohydrin may also be used, as for example, by use of a basic catalyst under pressure. The particular method by which the epihalohydrin is polymerized does not form a part of the present invention.

The conversion of the polyhalohydrin to the poly-quaternary ammonium salt may be accomplished readily by simply refluxing the reactants in a suitable solvent. Thus polar solvents, such as methyl, ethyl, propyl, isopropyl, butyl, and isobutyl alcohols, may be used. Similarly non-polar solvents such as the hydrocarbon solvents, hexane, benzene, cyclohexane, toluene, xylene, and the like may be used. In addition, mixtures of these various solvents, either polar or non-polar, or both, may be used. Other solvents include chloroform, carbon tetrachloride, nitro-methane, and in fact any solvent in which the reactants have at least some solubility.

The tertiary amines employed in the present invention for reaction with the polymerized halohydrin are cyclic in nature and include such materials as pyridine, alpha-, beta-, or gamma-picoline, other alkyl substituted pyridines, aryl substituted pyridines, alkaryl substituted pyridines, carboxy substituted pyridines, carbalkoxy substituted pyridines, nitro substituted pyridines, hydroxy substituted pyridines, alkyloxy substituted pyridines, aryloxy substituted pyridines, acylaminopyridines, alkylaminopyridines, acyl substituted pyridines, haloalkyl substituted pyridines, haloacyl substituted pyridines, and in fact any substituted pyridine. Also there may be used quinoline, isoquinoline, acridine, as well as substituted quinolines, isoquinolines, and acridines in which the substituents are as indicated for the pyridines, and indeed any cyclic compound wherein is contained one or more tertiary nitrogen atoms.

The following examples will serve to illustrate the invention:

Example 1

One mole of epichlorohydrin was dissolved in 300 parts of carbon tetrachloride and was treated with 7.1 parts of boron trifluoride-ethyl ether complex at a rate such that the temperature did not rise above 40° C. During part of the addition, a cooling bath was necessary in order to maintain this temperature. Once the addition was completed, the reaction mixture was allowed to stir for an hour whereupon it was washed successively with water, dilute sodium carbonate solution and again with water. From the carbon tetrachloride solution there was obtained a high yield of a yellow viscous oil which was soluble in most of the organic solvents such as carbon tetrachloride, chloroform, benzene and acetone, but which was insoluble in water and only partially soluble in aliphatic alcohols such as butyl alcohol. The product possessed a chlorine content of 35.8% and a molecular weight of about 570. Thus the polymer contained 5-6 units.

A mixture of 140 parts of polyepichlorohydrin prepared as described above, 500 parts of toluene and 300 parts of dry pyridine was defluxed for thirty-two hours. The product which settled out during the course of the reaction was dissolved in ethanol, treated with charcoal, and filtered. Removal of the alcohol yielded a semi-resinous product which was freely soluble in water, but which was insoluble in ether. The aqueous solution yielded an immediate precipitate with silver nitrate. The product was very hygroscopic. It analyzed for 20.9% chlorine which indicated that practically complete quaternary salt formation had taken place since the theoretical chlorine content on the basis of complete reaction is 19.9%.

*Example 2*

A mixture of 70 parts of polyepichlorohydrin of Example 1 in 700 parts of dry n-propyl alcohol was treated with 150 parts of dry pyridine, and the solution was heated on the steam bath for thirty-two hours. The solvent was removed to obtain a viscous syrup which was partially water soluble. An alcohol solution yielded an immediate precipitate with silver nitrate. The chlorine content of the product (30.3%) indicated that about one-third of the chlorine atoms of the polyepichlorohydrin had reacted to form quaternary salts.

*Example 3*

A homogeneous solution of 100 parts of polyepichlorohydrin of Example 1, 129 parts of quinoline and 600 parts of toluene was refluxed for thirty-three hours. The reaction mixture was treated with ether, and the ether solution was extracted with water. The water solution was concentrated to obtain a product whose chlorine content (25.4%) indicated that 43% of the chlorine atoms had reacted to form quinolinium salts. The ether solution was washed with dilute hydrochloric acid to remove quinoline and then with water. From it there was obtained a syrup whose chlorine content (33%) indicated 10% quaternary salt formation. This product was not water soluble, but was soluble in various organic solvents.

While various modifications of this invention have been described, it is to be understood that the invention is not limited thereto, but may be varied within the scope of the following claims.

I claim as my invention:

1. A quaternary ammonium salt of a polymerized epihalohydrin, the quaternary ammonium salt having the following unit structure

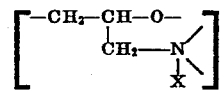

in which X is halogen and N is a nitrogen atom contained in a heterocyclic ring selected from the group consisting of pyridine, quinoline, isoquinoline, and acridine rings.

2. Quaternary ammonium salts according to claim 1 in which the number of such units in the molecule is from 2 to about 50.

3. Quaternary ammonium salts according to claim 1 in which the nitrogen is contained in a pyridine ring.

4. Quaternary ammonium salts of polymerized epihalohydrin, said quaternary ammonium salts containing the following unit structure

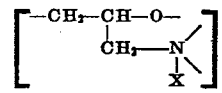

in which X is halogen and N is a nitrogen of a pyridine ring, and the number of such units in the molecule is from 2 to about 50.

5. Quaternary ammonium salts of polymerized epihalohydrin, said quaternary ammonium salts containing the following unit structure

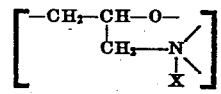

in which X is halogen and N is a nitrogen of a pyridine ring, and the number of such units in the molecule is from 6 to about 12.

HAROLD WITTCOFF.

No references cited.